A. MITCHELL.
PLOW.
APPLICATION FILED MAR. 5, 1918.

1,351,782.

Patented Sept. 7, 1920.

Inventor
A. Mitchell.

By Lacey & Lacey, Attorneys

UNITED STATES PATENT OFFICE.

ALEXANDER MITCHELL, OF PUEBLO, COLORADO.

PLOW.

1,351,782.  Specification of Letters Patent.  Patented Sept. 7, 1920.

Application filed March 5, 1918. Serial No. 220,538.

*To all whom it may concern:*

Be it known that I, ALEXANDER MITCHELL, a citizen of the United States, residing at Pueblo, in the county of Pueblo and State of Colorado, have invented certain new and useful Improvements in Plows, of which the following is a specification.

This invention relates to agricultural implements and has for its object the provision of simple and inexpensive means whereby a plow, harrow, cultivator or other implement may be operated without employing draft animals.

In carrying out the invention I make use of a velocipede structure, preferably in the form of a tricycle, driven by the feet of the rider or by motor or otherwise, and whose details of construction are unimportant excepting that its frame carries a draw bar projecting rigidly to the rear and obliquely downward over and beyond the driving axle, and this bar in turn carries an adjustably mounted earth engaging implement or blade such as a plow. In other words, the gist of the invention is making use of the so called velocipede structure both to support the draw bar at a fixed angle to the surface of the earth and to drag the blade along the desired line of work, whereby the rider simultaneously directs the plow and guides the propelling element, and in some cases drives the latter himself, and meanwhile his weight holds the blade to its work and he may vary its angle as desired.

The invention is illustrated in the accompanying drawings and will be hereinafter fully described, the novel features being subsequently particularly set forth in the claims.

In the drawings:—

Figure 1:
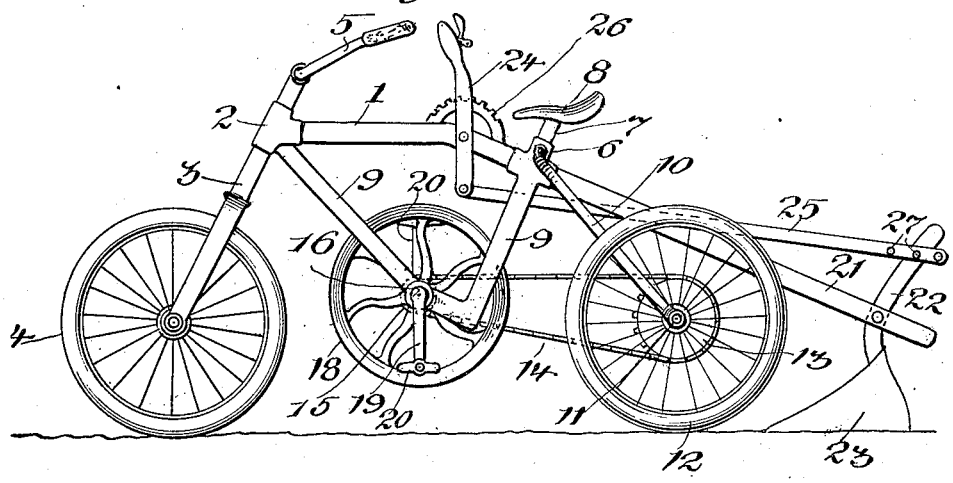
Figure 1 is an elevation of a plow embodying the invention.
Figure 2:
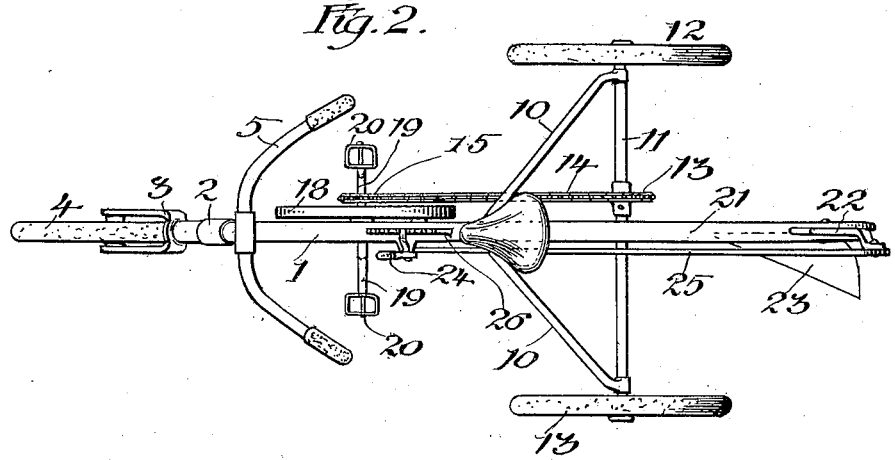
Fig. 2 is a plan view of the same.

In carrying out my invention, I employ a velocipede or tricycle structure having a frame comprising a perch 1 at the front end of which is a steering head 2 having a fork 3 mounted therein, said fork having a steering wheel 4 mounted in its lower end and being provided with a handle bar 5 at its upper end. The perch 1 has its rear end fitted in a coupling 6 which also receives and secures the seat post 7 on the upper end of which is a saddle 8. Hangers 9 depend from the steering head and the said coupling 6 and support the propelling mechanism. Braces 10 diverge downwardly from the coupling 6 and carry the axle 11 in their lower ends and driving wheels 12 12' are mounted on the ends of the axle while a sprocket wheel 13 is secured thereon near the center thereof. Either or both the driving wheels may be fast on the axle. That numbered 12 in the drawings will travel on the land side and that numbered 12' will travel on the plowed ground, and their tires and treads should be selected accordingly. I should prefer that the landside driver be fast on the axle if the plow 23 (described hereinafter) is employed, because its share will produce side lash of the beam tending to swing its rear end toward that wheel. A sprocket chain 14 is trained around the sprocket 13 and a sprocket pinion 15 secured upon the driving shaft 16 journaled in the lower portion of the frame presented by the hangers 9. The driving shaft carries a fly wheel 18 and is shown as equipped with cranks 19 at its ends, said cranks having pedals 20 which may be easily engaged by an operator from the saddle 8. A motor may be mounted upon the frame to operate the driving shaft, if desired.

The coupling 6 extends beyond the axle and rigidly secured therein is the forward end of a draw bar 21. The draw bar extends rearwardly and, at or near the rear end, I pivot a substantially upright standard 22 carrying a plow or other earth engaging blade or implement 23 at its lower end. A lever 24 is fulcrumed upon the perch forward of the seat post 1 and a link 25 connects the lower end of the lever with the upper portion of the standard 22. The lever is equipped with a latch adapted to engage a holding segment 26 on the perch whereby to hold the parts in a set position. The link is preferably provided with a plurality of openings through any of which the connecting pivot pin may be inserted into the standard so that the angle of penetration of the plow may be varied as required.

The operation is thought to be obvious. A rider upon the saddle applies rotating force through his feet to the pedals 20 or controls the motor so that the crank shaft and the pinion thereon will be rotated. The motion of the driving shaft is transmitted to the axle 11 and the wheel 12 so that the machine will travel over the field and the draw bar 21 will drag the plow through the ground to form a furrow. By properly manipulating the adjusting lever 24, the plow standard and blade may be adjusted at will and without the rider dismounting.

The machine is very simple and compact and may be easily operated.

Having thus described the invention, what I claim as new is:

A wheeled vehicle including a seat post, a draw bar extending rearwardly and downwardly from the seat post to a point beyond the rear wheels, a substantially upright standard pivoted intermediate its ends to the rear end of said draw bar and carrying an earth engaging blade at its lower end, an operating lever pivoted to the frame of the vehicle forwardly of said seat post, and a link connected at one end to said lever and being pivotally and adjustably connected at its opposite end to said standard.

In testimony whereof I affix my signature

ALEXANDER MITCHELL. [L. S.]